(12) United States Patent
Neofytides et al.

(10) Patent No.: US 7,376,587 B1
(45) Date of Patent: May 20, 2008

(54) METHOD FOR ENABLING TRANSFER OF FUNDS THROUGH A COMPUTER NETWORK

(75) Inventors: Cheryl L. Neofytides, Floral Park, NY (US); Aamer Ali Baig, Forest Hills, NY (US)

(73) Assignee: Western Union Financial Services, Inc., Englewood, CO (US)

(*) Notice: Subject to any disclaimer, the term of this patent is extended or adjusted under 35 U.S.C. 154(b) by 0 days.

(21) Appl. No.: 09/613,615

(22) Filed: Jul. 11, 2000

(51) Int. Cl.
*G06Q 30/00* (2006.01)

(52) U.S. Cl. ........................................ 705/26

(58) Field of Classification Search ............ 705/44, 705/39, 40, 42, 26, 64, 67, 75, 56, 34, 18; 235/380; 707/10
See application file for complete search history.

(56) References Cited

U.S. PATENT DOCUMENTS

| | | |
|---|---|---|
| 5,220,501 A | 6/1993 | Lawlor et al. |
| 5,555,496 A | 9/1996 | Tackbary et al. |
| 5,629,982 A | 5/1997 | Micali |
| 5,664,110 A | 9/1997 | Green et al. |
| 5,699,528 A | 12/1997 | Hogan |
| 5,732,400 A | 3/1998 | Mandler et al. |
| 5,745,886 A | 4/1998 | Rosen |
| 5,757,917 A | 5/1998 | Rose et al. |
| 5,825,003 A | 10/1998 | Jennings et al. |
| 5,826,241 A | 10/1998 | Stein et al. |
| 5,897,622 A | 4/1999 | Blinn et al. |
| 5,899,980 A | 5/1999 | Wilf et al. |
| 5,909,492 A * | 6/1999 | Payne et al. ............ 705/44 |
| 5,915,023 A * | 6/1999 | Bernstein ............... 705/39 |
| 5,936,221 A | 8/1999 | Corder et al. |
| 5,960,412 A | 9/1999 | Tackbary et al. |
| 5,963,647 A | 10/1999 | Downing et al. |

(Continued)

FOREIGN PATENT DOCUMENTS

EP    0 745 961 A2    4/1996

(Continued)

OTHER PUBLICATIONS

"You've Got Money?" Rene Wijnen, Bank Technology News, New York, Jun. 2000, vol. 13, Issue 6, p. 1.*

(Continued)

*Primary Examiner*—James Zurita
(74) *Attorney, Agent, or Firm*—Morris Manning & Martin LLP

(57) ABSTRACT

A method for enabling a transfer of funds through a computer network between a first party registered with a computer server of the computer network and a second party not previously registered with the computer server. The transfer of funds includes payments or requests for money initiated by the first party. In one aspect, the method includes receiving payment instructions from the first party; sending an email to a second party with directions for receiving the payment amount; and, if the directions are followed, transferring the payment amount to the second party. In another aspect, the method includes receiving a request for money from the first party; sending a notification to the second party with directions for providing the requested amount to the first party; and, if the directions are followed, transferring the requested amount from the second party to the first party.

21 Claims, 10 Drawing Sheets

U.S. PATENT DOCUMENTS

| | | | |
|---|---|---|---|
| 5,966,698 A | 10/1999 | Pollin | |
| 5,974,146 A | 10/1999 | Randle et al. | |
| 6,029,150 A | 2/2000 | Kravitz | |
| 6,032,133 A | 2/2000 | Hilt et al. | |
| 6,044,362 A * | 3/2000 | Neely | 705/34 |
| 6,064,990 A * | 5/2000 | Goldsmith | 705/75 |
| 6,070,150 A | 5/2000 | Remington et al. | |
| 6,070,798 A | 6/2000 | Nethery | |
| 6,078,907 A * | 6/2000 | Lamm | 705/40 |
| 6,081,790 A | 6/2000 | Rosen | |
| 6,088,683 A * | 7/2000 | Jalili | 705/26 |
| 6,098,053 A | 8/2000 | Slater | |
| 6,119,106 A | 9/2000 | Mersky et al. | |
| 6,122,625 A | 9/2000 | Rosen | |
| 6,128,603 A * | 10/2000 | Dent et al. | 705/40 |
| 6,167,386 A | 12/2000 | Brown | |
| 6,173,272 B1 | 1/2001 | Thomas et al. | |
| 6,175,823 B1 | 1/2001 | Van Dusen | |
| 6,189,787 B1 * | 2/2001 | Dorf | 235/380 |
| 6,202,054 B1 | 3/2001 | Lawlor et al. | |
| 6,246,996 B1 | 6/2001 | Stein et al. | |
| 6,247,047 B1 * | 6/2001 | Wolff | 705/26 |
| 6,263,446 B1 * | 7/2001 | Kausik et al. | 705/67 |
| 6,269,369 B1 * | 7/2001 | Robertson | 707/10 |
| 6,289,322 B1 * | 9/2001 | Kitchen et al. | 705/40 |
| 6,292,789 B1 | 9/2001 | Schutzer | |
| 6,317,745 B1 | 11/2001 | Thomas et al. | |
| 6,324,525 B1 | 11/2001 | Kramer et al. | |
| 6,339,766 B1 | 1/2002 | Gephart | |
| 6,351,739 B1 | 2/2002 | Egendorf | |
| 6,356,878 B1 | 3/2002 | Walker et al. | |
| 6,405,181 B2 | 6/2002 | Lent et al. | |
| 6,411,942 B1 | 6/2002 | Fujimoto | |
| 6,449,599 B1 | 9/2002 | Payne et al. | |
| 7,010,512 B1 * | 3/2006 | Gillin et al. | 705/39 |
| 2001/0032183 A1 | 10/2001 | Landry et al. | |
| 2002/0023055 A1 | 2/2002 | Antognini et al. | |

FOREIGN PATENT DOCUMENTS

| | | |
|---|---|---|
| EP | 0 745 961 A3 | 7/1998 |
| EP | 0 949 596 A2 | 10/1999 |
| EP | 0949 596 A2 | 10/1999 |
| EP | 1 077 436 A2 | 2/2001 |
| JP | 411025171 A * | 1/1999 |
| WO | WO 98/49644 | 11/1998 |
| WO | WO 99/22291 | 5/1999 |
| WO | WO 00/22559 A1 | 4/2000 |
| WO | WO 00/46725 * | 8/2000 |
| WO | WO 00/54122 A2 | 9/2000 |
| WO | WO 00/67177 A2 | 11/2000 |
| WO | WO 00-79452 A2 | 12/2000 |
| WO | WO 00/79452 A2 | 12/2000 |
| WO | WO 01/04816 | 1/2001 |
| WO | WO 01/04816 A1 | 1/2001 |

OTHER PUBLICATIONS

"Beaming Money by Email is Web's Next Killer App," PR Newswire, New York, Nov. 16, 1999, p. 1.*

"billserv.com Launches bills.com, an Internet Portal for Consumers to Pay All Bills Online at No Cost", Business Editors & High-Tech Writers. Business WIre, New York, Feb. 22, 2000, p. 1.*

Gardyne, Allan, Introducing PayPal, Dec. 9, 1999, downloaded from the Internet http://www.associateprograms.com/articles/385/Introducing-PayPal on Oct. 29, 2006.*

Behind the spree in payments for C2C, Cathy Bowen. Credit Card Management. New York: Apr. 2000. vol. 13, Iss. 1; p. 28, 8 pgs.*

"Billpoint Web Site," found on the World Wide Web at http://www.billpoint.com, 24 pp.

"I-Escrow Web Site," found on the World Wide Web at http://www.iescrow.com, 12 pp.

"PayMyBills.com Web Site," found on the World Wide Web at http://www.paymybills.com, 18 pp.

"PayPal Web Site," found on the World Wide Web at http://www.paypal.com, 19 pp.

"PayMe.com Web Site," found on the World Wide Web at http://www.payme.com, 14 pp.

"eMoneyMail Web Site," found on the World Wide Web at http://www.emoneymail.com, 16 pp.

"eCount Web Site," found on the World Wide Web at http://www.ecount.com, 15 pp.

"Tradesafe.com Web Site," found on the World Wide Web at http://www.tradesafe.com, 18 pp.

dotBANK; "The Way to Send and Receive Money on the Internet;" retrieved from the Internet on Feb. 7, 2000 at http://www.dotbank.com/; pp. 1-7.

AmeriNet, Inc.; "The Best Idea in Payment Systems Since the Credit Card;" retrieved from the Internet on Feb. 7, 2000 at http://www.devit-it.com/; pp. 1-8.

TransPoint; "The Way to Pay Online the Service;" retrieved from the Internet on Feb. 10, 2000 at http://www.transpoint.com/service_questions.asp; pp. 1-12.

Intell-A-Check! "The Way to Get Paid;" retrieved from the Internet on Feb. 7, 2000 at http://www.icheck.com/; pp. 1-7.

TeleCheck: "Making Checks Our Responsibility;" retrieved from the Internet on Feb. 7, 2000 at http://www.telecheck.com/home/home.html; pp. 1-8.

Author Unknown: "About Western Union",www.westernunion.com, Jun. 10, 2003, 9 pages, found on "www.westernunion.com/info/aboutUsIndex.asp?country=global" internet website and printed on Jun. 10, 2003.

Ina Steiner: "PayPal Online Payment Service—Another Way to Pay for Auction Items", www.auctionbytes.com , Feb. 20, 2000, 4 pages No. 8, ISSN-1528-6703, found on www.auctionbytes.com internet website and printed on Sep. 23, 2003.

Ina Steiner: "BidPay.com Offers Click and Pay Service for Buyers", www.auctionbytes.com, Jan. 23, 2000, 4 pages, No. 8, ISSN-1528-6703, found on www.auctionbytes.com internet website and printed on Sep. 23, 2003.

Ina Steiner: "Follow-up to BidPay Article", www.auctionbytes.com, Feb. 7, 2000, 4 pages, No. 8, ISSN-1528-6703, found on www.auctionbytes.com internet website and printed on Sep. 23, 2003.

Steven Baras: "Staff Letters and Memoranda", State of New York Banking Department, Jul. 18, 2000, 2 pages, found on www.banking.state.ny.us/lo000718.htm internet website and printed on Sep. 23, 2003.

Almar Latour: "PayPal Electronic Plan May Be On the Money in Years to Come", The Wall Street Journal Interactive Edition, Nov. 15, 1999, found on www.paypal.com/html/wsj.html internet website and printed on Sep. 23, 2003.

Hal Plotkin: "Beam Me up Some Cash", Silicon Valley Insider, Sep. 8, 1999, 3 pages, found on www.halplotkin.com/cnbcs029.htm internet website and printed on Sep. 23, 2003.

Karen Epper Hoffman: "PayPal Still Running Free, But the e-payments company's carefree days may be numbered if regulators decide it's essentially a bank.", Bank Technology News, date of publication unknown, from the content cited, it should be after Mar. 2001, 3 pages, found on www.banktechnews.com/btn/articles/btnoct-1-13.shtml internet website and printed on Sep. 23, 2003.

Author Unknown: "PayPal.com Case Study", date of publication unknown, latest article quoted was published on May 9, 2000, 7 pages, found on http://fox.rollins.edu/~slackman/paypal.htm internet website and printed on Sep. 23, 2003.

Author Unknown: (indicated as Confinity, Inc): "PayPal for the Palm", 2 pages, date of publication unknown, found on www.handheldnews.com/file.asp?ObjectID=5401 internet website and printed on Oct. 10, 2003.

Author Unknown: "PayPal News" 3 pages, date of publication unknown, found on www.andrys.com/paypal.html internet website and printed on Sep. 23, 2003.

Author Unknown: "Online Payment Services", 3 pages, date of publication unknown, from the Copyright 1999-2003, it was believed to be sometime in 2003, found on www.auctionbytes.com/cab/pages/payment internet website and printed Sep. 30, 2003.

Ina Steiner: "Accepting Credit Cards When You Sell Items: ProPay and BillPoint Payment Services", Jun. 18, 2000, 4 pages, found on www.auctionbytes.com/cab/abu/y200/m06/abu0016/s04 internet website and printed on Sep. 30, 2000.

Author Unknown: "WHOIS search rResults—WHOIS Record for bidpay.com," 2 pages, date of publication unknown but believed to be after the filing of the present application, found on www.networksolutions.com internet website and printed on Oct. 14, 2003.

Author Unknown: "First Data Aquires PaySys International," 2 pages, Apr. 30, 2001, found on www.paysys.com/news/press2001/paysys043001.pdf internet website and printed on Oct. 14, 2003.

Author Unknown: "PaySys sign up four Asian Distributors," 3 pages, date of publication unknown but believed to be after the filing of the present application, found on www.bizjournals.com internet website and printed on Oct. 14, 2003.

Author Unknown: "VisionPLUS Consumer Payment Solution Overview," 2 pages, date of publication unknown but believed to be after the filing date of the present application, found on www.paysys.com internet website and are printed on Oct. 14, 2003.

Author Unknown: "PaySys—Company Overview," 2 pages, date of publication unknown but believed to be after the filing of the present application, found on www.paysys.com internet website and printed on Oct. 14, 2003.

Author Unknown: "BidPay: Buyer FAQs—Sending Payments and Using the Money Order Service" 7 pages, date of publication unknown but believed to be after the filing of the present application, found on www.bidpay.com internet website and printed on Oct. 14, 2003.

Author Unknown: "BidPay: Seller FAQs—Receiving Payments and Using the Money Order Service" 7 pages, date of publication unknown but believed to be after the filing of the present application, found on www.bidpay.com internet website and printed on Oct. 14, 2003.

Author Unknown: "A million credit card transactions in five hours" 2 pages, date of publication unknown but believed to be after the filing date of the present application, found on www.hoise.com internet website and printed on Oct. 14, 2003.

* cited by examiner

FIG. 3

METHOD FOR ENABLING TRANSFER OF FUNDS THROUGH A COMPUTER NETWORK

FIELD OF THE INVENTION

The invention relates generally to computer-implemented financial transactions, and more particularly relates to processing person-to-person payments and money requests using a computer network.

BACKGROUND OF THE INVENTION

One individual (the payor) may wish to pay money to another individual (the payee) for any of a variety of reasons. Frequently, the payor owes a debt to the payee. The debt may be an informal IOU or a more formal transaction. Other times, the payor may wish to give the money to the payee as a gift.

Until now, individual payors have typically completed such payments via cash or paper check. More convenient payment methods exist, such as credit cards and bank account debits through electronic fund transactions. However, the payor typically does not have the option to use these other payment methods when the payee is an individual as opposed to a retail business that has been pre-established as an online merchant. Thus, there is a need in the art for enabling individuals to use more convenient money transfer methods.

For individuals who participate in frequent money transfers to or from other individuals, managing all these money transfers is also inconvenient. For example, a payor may receive requests for money from multiple payees through different communication methods, including in person, over the phone, and in writing. Keeping track of requests for money is therefore time consuming. Likewise, the payee is often not sure of the best way to notify the payor of a money request. Accordingly, there is a need in the art for a convenient method by which a payee can request money from a payor.

Furthermore, a payor often desires to initiate a particular money transfer only at a future time. This may be the case with a birthday gift of money or a debt that is not due until a later date. If the payor attempts to wait until the intended transfer date to give the payee a check or cash, however, the payor runs the risk that the payor will either forget or not have the opportunity to give the check or cash to the payee. This problem is particularly cumbersome when the payor must make recurring payments of a fixed amount, such as for rent in an apartment. Therefore, there is also a need in the art for a mechanism for scheduling future payments that the payor does not want to initiate until a later time. In general, there is a need in the art for safe and convenient methods by which individuals can engage in money transfers.

SUMMARY OF THE INVENTION

The present invention meets the needs described above in a server, called a payment enabler, that processes person-to-person payment commands and money requests received from over a computer network such as the Internet. The payment enabler allows a remote individual to register for an account through which the individual can make payments to other individuals, request money from other individuals, and access other functionality to facilitate the management of the individual's financial transactions. In addition to initiating immediate money transfer and request money transactions, an individual may use the payment enabler to schedule future or recurring transactions.

At the time an individual authorizes a payment to another person or directs the payment enabler to request money from another person, the person to whom the payment or money request is directed may, but need not, have already registered for an account with the payment enabler. To communicate with individuals, the payment enabler may use both Web pages and e-mail.

An intermediary typically operates the payment enabler and acts as a conduit for the money transfer from one individual (the payor) to another individual (the payee). This enables the payor to pay through a variety of different payment methods and the payee to receive payment through a variety of different methods. Individuals may make payments from and receive money transfers into a stored value account.

Address book functionality may provide users the ability to retain information on counter parties. The address book may be integrated into the money transfer and money request interfaces to allow an individual to quickly select the counter party for a transaction.

Generally described, the present invention comprises a method for providing a person-to-person payment service through a computer server of a computer network. The computer server maintains a database of e-mail addresses corresponding to individuals having accounts that provide the individuals with functionality offered by the computer server for online management of financial transactions. The computer server receives from a first individual located at a remote computer an e-mail address of a second individual to whom the first individual wants to send an amount of money. Then, the computer server searches the database of e-mail addresses for the e-mail address of the second individual. If the e-mail address of the second individual was found in the database of e-mail addresses, then the payment of the amount of money from the first individual to the second individual is completed.

To complete the payment of the amount of money from the first individual to the second individual, the computer server may first initiate a transfer of the amount of money from the first individual to a first intermediary bank account using a first money transfer method. The computer server then transfers the amount of money from a second intermediary bank account to the second individual using a second money transfer method.

The present invention also comprises a method for providing a money request service through a computer server of a computer network. The computer server maintains a database of e-mail addresses corresponding to individuals having accounts that provide the individuals with functionality offered by the computer server for online management of financial transactions. The computer server then receives from a first individual located at a remote computer an e-mail address of a second individual from whom the first individual wants to request an amount of money. The computer server sends an e-mail to the e-mail address of the second individual to notify the second individual that the first individual is requesting the amount of money. The computer server then receives authorization from the second individual to pay the amount of money to the first individual. The computer server next completes a payment of the amount of money from the second individual to the first individual.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 3 is a block diagram illustrating an account history Web page in accordance with an exemplary embodiment of the present invention.

DETAILED DESCRIPTION OF EXEMPLARY EMBODIMENTS

Figure 1:
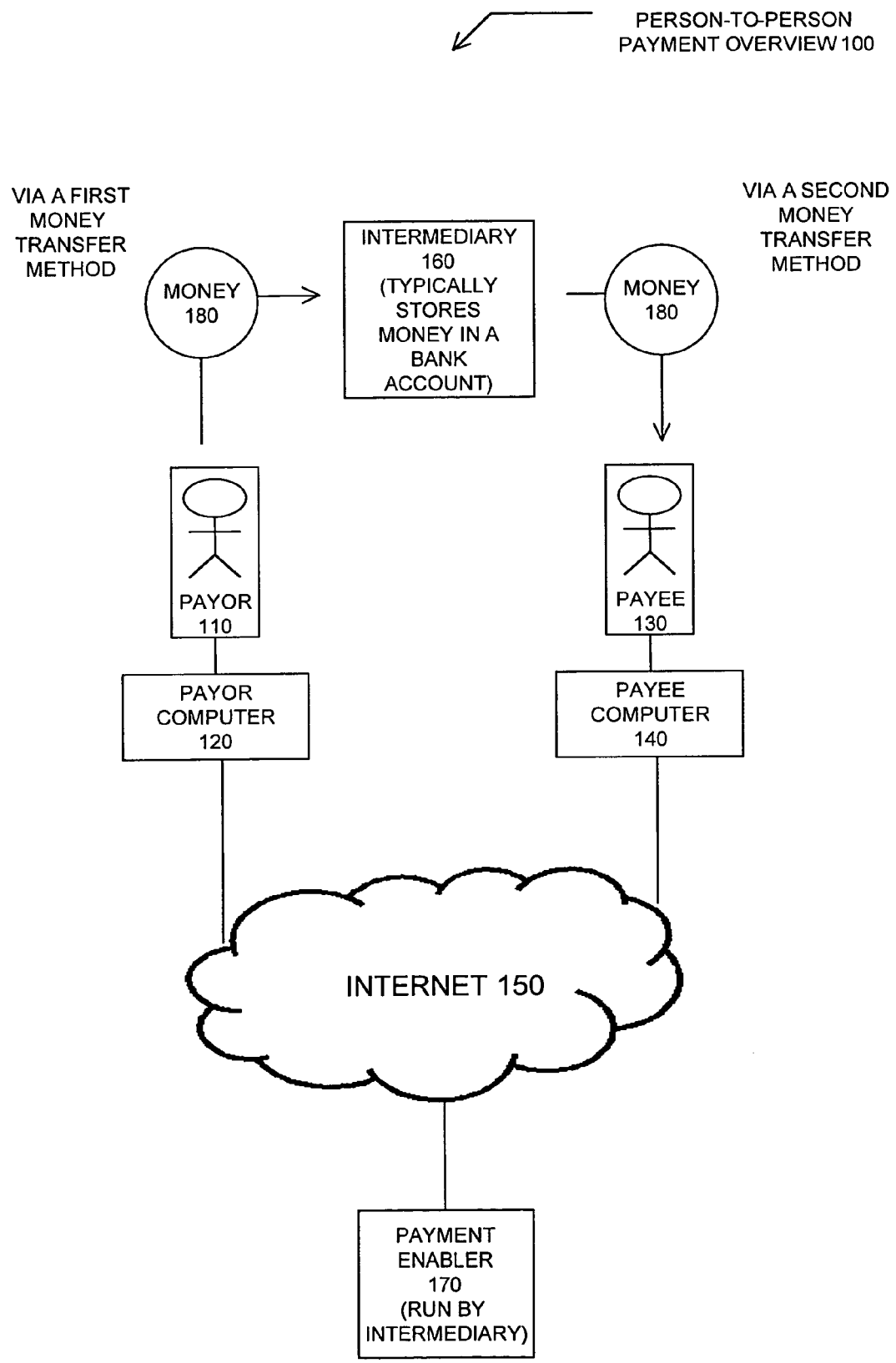
FIG. 1 is a block diagram of an overview of person-to-person payments in accordance with an exemplary embodiment of the present invention.

The present invention is typically embodied in a server, called a payment enabler, that processes person-to-person payment commands and money requests received from over a computer network such as the Internet. The payment enabler allows an individual to register for an account through which the individual can make payments to other individuals, request money from other individuals, and access other functionality to facilitate the management of the individual's financial transactions. The payment enabler may, for example, provide the user of an account with access to online statements listing the user's pending and history (past) transactions.

To communicate with individuals, the payment enabler may use both Web pages and e-mail. Web pages may allow the payment enabler to both communicate information to and receive information from an individual. E-mail provides a convenient mechanism through which the payment enabler can reach individuals who have not registered with the payment enabler and update individuals about the status of a particular transaction.

At the time an individual authorizes a payment to another person or directs the payment enabler to request money from another person, the person to whom the payment or money request is directed may, but need not, have already registered for an account with the payment enabler. If the person to whom the payment or money request is directed does not already have an account with the payment enabler, then the payment enabler e-mails that person to invite his or her registration for an account so that the transaction can be completed.

An intermediary typically operates the payment enabler and acts as a conduit for the money transfer from one individual (the payor) to another individual (the payee). This enables the payor to pay through a variety of different payment methods and the payee to receive payment through a variety of different money receipt methods.

For example, individuals may make payments from and receive money transfers into a stored value account, also called a virtual private payment account. The individual may have a physical card associated with the stored value account. Using the card, the individual may make payments to brick-and-mortar stores by drawing upon funds in the stored value account.

In addition to initiating immediate money transfer and request money transactions, an individual may use the payment enabler to schedule a future or recurring payment or money request to another individual. An individual may schedule the dates for a future or recurring transaction via selection from a pull-down menu, typing in the dates, selecting dates by clicking on them in a graphical calendar interface, and the like. For a recurring transaction, the individual may use any of the above methods to specify a date to make the initial payment or money request and then specify a frequency and duration for repeating the payment or request.

Address book functionality may provide users the ability to retain information on counter parties. The address book may be integrated into the money transfer and money request interfaces to allow an individual to select quickly the counter party for a transaction.

Although the present invention has thus far been described in the context of transactions between individuals, one skilled in the art should appreciate that the methods described in the detailed description can also apply to transactions where one or both of the parties is another type of entity, such a business, merchant, corporation, group, or the like. Moreover, an individual may command the payment enabler to make a payment to several different individuals in a single transaction. Likewise, an individual may instruct the payment enabler to request money on the individual's behalf from several other people in a single transaction.

Money transfer methods between individuals are also discussed in U.S. patent application Ser. No. 09/476,386, the disclosure of which is hereby incorporated by reference. With the help of the figures, in which like numerals refer to like elements throughout the several figures, the detailed description now further describes aspects of the present invention.

Person-to-Person Payment Overview

FIG. 1 provides an overview 100 of person-to-person payments according to an exemplary embodiment of the present invention. The overview 100 illustrates a payor 110 who needs to transfer an amount of money (also called a payment) 180 to the payee 130.

The payment enabler 170 is typically hosted by a server linked to a computer network such as the Internet 150.

Accordingly, the payment enabler 170 is accessible over the Internet 150 by individuals (e.g., the payor 110 and the payee 130) located at computers (e.g., the computers 120 and 140) that are remote from the payment enabler. The payment enabler 170 enables these individuals to register for an account with which they can make payments to other individuals, request money from other individuals, and access other functionality to facilitate the management of the individuals' financial transactions.

The payor 110 typically accesses the Internet 150 through the payor computer 120, and the payee 130 typically accesses the Internet through the payee computer 140. The payor computer 120 and the payee computer 140 may be linked to the Internet 150 in the customary manner. To enable the payor 110 and the payee 130 to access the functionality of the various servers connected to the Internet 150, the payor computer 120 and the payee computer 140 typically run a Web browser that enables their users to communicate with these various servers through Web pages. The payor 110 and the payee 130 may also access the payment enabler 170 in this manner. Other computer users (not shown) may access the Internet 150 and the payment enabler 170 in a similar manner.

Using the payment enabler 170, the payor 110 may complete a money transfer of a payment 180 to the payee 130. In such a transaction, an intermediary 160 may act as a conduit for the money transfer of the amount 180. Typically, the intermediary 160 is a business that operates the payment enabler 170. By acting as a conduit for a money transfer between the payor 110 and the payee 130, the intermediary 160 enables the payor to pay through a variety of different payment methods and the payee to receive payment through a variety of different money receipt methods. As shown in the overview 100, the intermediary 160 collects the payment 180 from the payor 110 via a first money transfer method, and the intermediary transfers the payment to the payee 130 via a second money transfer method.

Typically, the intermediary 160 receives the transfer of money 180 via the first money transfer method into a first bank account. The intermediary 160 typically transfers money 180 from a second bank account to the payee 130 via the second money transfer method. The first bank account and the second bank account may, but need not, be the same account.

Although the intermediary 160 may receive the payment 180 from the payor 110 before the intermediary transfers the payment to the payee 130, the intermediary may choose to pay the payee before receiving payment from the payor. In this case, the intermediary 160 assumes the risk of nonpayment by the payor 110. Instead of assuming the risk of nonpayment in order to pay the payee 130 before receiving payment 180 from the payor 110, the intermediary 160 may pay a third party (not shown) to assume the risk of nonpayment by the payor.

Those skilled in the art will be familiar with a variety of money transfer methods. The first money transfer method from the payor 110 to the intermediary 160 may comprise such payment methods as receiving a deposit of an amount of cash by the payor at the store of a payment processor that transfers the amount to the intermediary, debiting a credit card of the payor, debiting a bank account of the payor in an electronic fund transaction, debiting a stored value account (also called a virtual private payment account) of the payor, receiving a paper check from the payor, and the like. The second money transfer method from the intermediary 160 to the payee 130 may comprise such money receipt methods as debiting a bank account of the intermediary to fund the dispensing of cash to the payee through an automated teller machine (ATM), dispensing cash to the payee at a store of a payment processor that funds the transaction by debiting a bank account of the intermediary, crediting a credit card of the payee, crediting a bank account of the payee in an electronic fund transaction, crediting a stored value account of the payee, sending a paper check to the payee, and the like.

By way of further explanation, a stored value account may have a balance that can be credited and debited. A business managing the stored value account typically guarantees the account owner the ability to convert the account balance to cash or cash-equivalents through withdrawals or payments to other entities made against the account balance. For the account owner to make a payment to an entity against the balance in a stored value account, that entity typically arranges to accept payment from the business managing the stored value account prior to the transaction. When the business managing the stored value account receives money on the behalf of the account owner, the balance of the account owner's stored value account is credited.

The transfer of money 180 via the first money transfer method and/or the second money transfer method may be executed using money transfer processing systems (not shown) that are managed by the intermediary 160. Alternatively, either or both of these transfers may be executed using money transfer processing systems (not shown) of third parties. To direct a money transfer processing system to perform a money transfer and provide it with the appropriate transaction details, the payment enabler 170 may communicate with the processing system over the Internet 150, over dedicated network connections, or through other means. The details of money transfer processing systems for various payment methods and money receipt methods are well known to those skilled in the art.

Hardware and Software for Implementing Person-to-Person Payments

The payor computer 120, the payee computer 140, and the server hosting the payment enabler 170 may each have typical features of a computer system, such as a processing unit, a system memory containing random access memory (RAM) and read only memory (ROM), and a system bus that couples the system memory to the processing unit. The computer may also include various memory storage devices, such as a hard disk drive, a magnetic disk drive (e.g., to read from or write to a removable magnetic disk), and an optical disk drive (e.g., to read from or write to optical media such as a CD-ROM). The payor computer 120 and the payee computer 140 may also comprise devices capable of wireless access to the Internet 150.

A number of program modules may be stored in the drives and RAM of the computer system. Program modules control how the computer system functions and interacts with the user, with input/output devices, or with other computers. Program modules include routines, an operating system, application program modules, data structures, browsers, and other software or firmware components. The invention may conveniently be implemented in various program modules that are stored on the computers illustrated in the overview 100 and implement the methods described in the detailed description.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

One skilled in the art should recognize that the various computers 120, 140, and 170 may require one or more databases for storing information pertinent to their roles in the person-to-person payment methods of the present invention. In the detailed description, these databases may be described with respect to their functionality or the information stored. One skilled in the art should recognize that a variety of different database implementations are capable of providing the described functionality or storing the described information. Accordingly, details of such database implementations need not be described. Where details of a database implementation are described, the detailed description provides them by way of example, not by way of limitation.

Accessing the Functionality of the Payment Enabler

Figure 2:
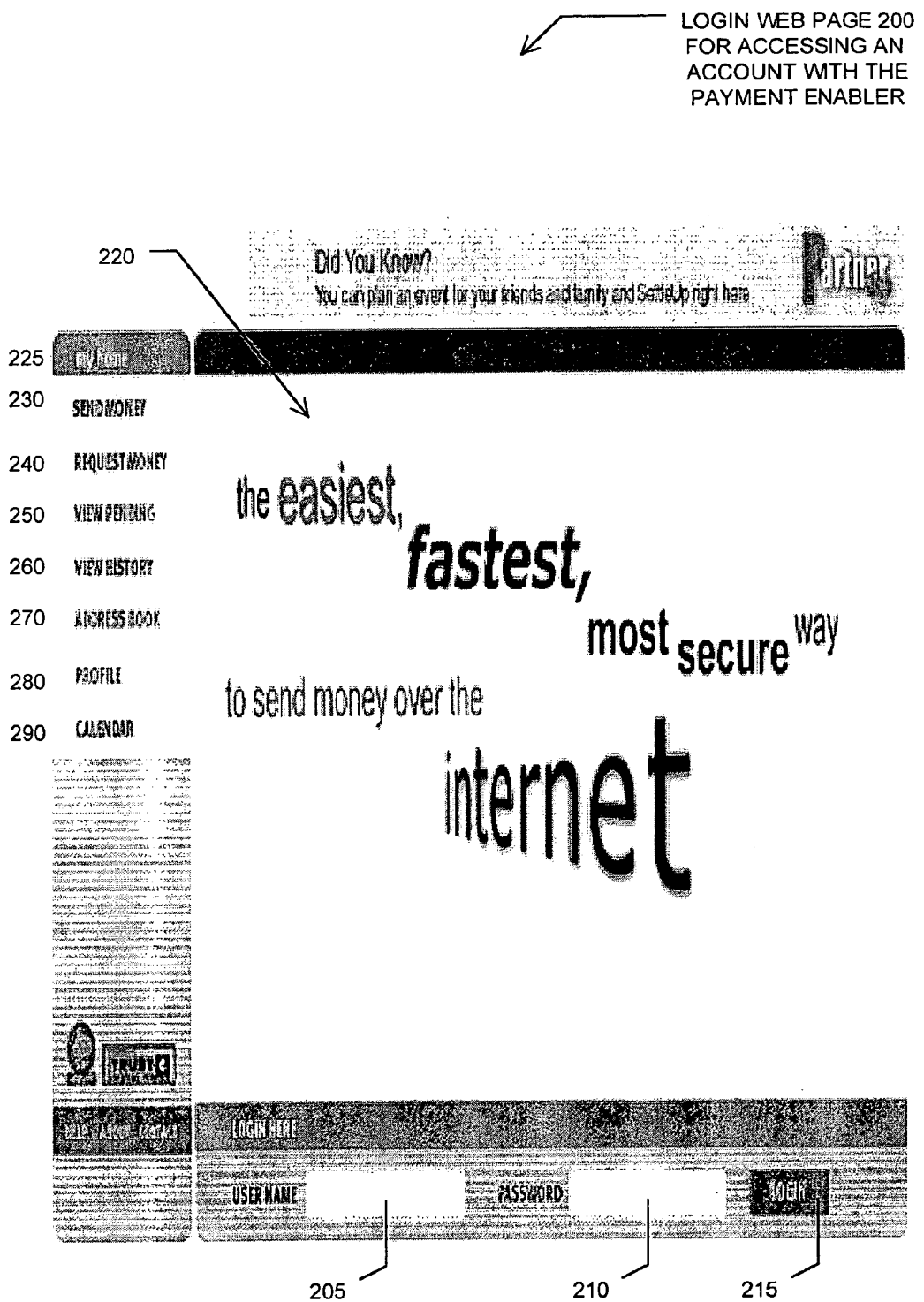
FIG. 2 is a block diagram illustrating a log-in Web page for accessing an account with the payment enabler in accordance with an exemplary embodiment of the present invention.

FIG. 2 is a block diagram illustrating an exemplary login Web page 200 through which a user of the payment enabler 170 can access his or her account. This account enables the user to access the features of the payment enabler. If the user makes a payment 180 to another individual using the payment enabler 170, then the user is referred as the payor 110 with respect to that particular transaction. If the user receives a payment from another individual through the payment enabler 170, then that user is referred to as a payee 130 with respect to that particular transaction. Through the account, the user also has access to other functionality of the payment enabler 170 for facilitating the management of that user's financial transactions.

As already described, the payment enabler 170 may require the user to undergo a registration process before activating an account for the user. As a result of that registration process, the user may be assigned a user name and a password. To access his or her account, the user enters the assigned user name in box 205 and the password in box 210. When the user next clicks the "LOGIN" button 215, the payment enabler 170 determines if the password on file for the account associated with the user name supplied by the user matches the password supplied by the user. If so, then the payment enabler 170 grants the user access to the account associated with the user name supplied by the user.

The leftmost side of the login Web page 200 may have several buttons (225, 230, 240, 250, 260, 270, 280, and 290), each labeled and associated with a particular feature of the payment enabler 170. By selecting a particular button, perhaps with a pointing device such as a mouse, the user can access the feature of the payment enabler associated with that button. These buttons (225, 230, 240, 250, 260, 270, 280, and 290) are typically inactive until the user has been granted access to the user's account through the login process.

The features associated with each of the buttons 225, 230, 240, 250, 260, 270, 280, and 290 are now discussed in turn. In response to the user clicking the button 225, the payment enabler 170 may provide the user with a Web page alerting the user to new money requests received and payments completed since this button was previously selected. In response to the user clicking the button 230, the payment enabler 170 initiates the "send money" process 600 (described in more detail later in conjunction with the description of FIGS. 6-8), which allows the user (the payor 110 with respect to this transaction) to send money to another individual, the payee 130. In response to the user clicking the button 240, the payment enabler 170 initiates the "request money" process 900 (described in more detail later in conjunction with the description of FIGS. 9 and 10), which allows the user (the payee 130 with respect to this transaction) to request money from another individual, the payor 110.

In response to the user clicking the button 250, the payment enabler 170 provides the user with an online statement of pending "send money" or "request money" transactions. In response to the user clicking the button 260, the payment enabler 170 provides the user with an online statement of history (i.e., past or completed) "send money" or "request money" transactions. Such an online statement of completed transactions is further described in more detail later in conjunction with the description of FIG. 3.

In response to the user clicking the button 270, the payment enabler 170 provides the user with an address book interface 400 (described in more detail later in conjunction with the description of FIG. 4). This address book interface 400 provides the user with extensive address book functionality.

In response to the user clicking the button 280, the payment enabler 170 provides the user with a Web page having a summary of the user's profile (i.e., registration information). Through this Web page, the user may be able to update his or her profile. Updating profile information may include adding or deleting money transfer methods for either making payments or receiving payments. The user may also change the default payment or money receipt method for the user's account through this feature.

In response to the user clicking the button 290, the payment enabler 170 may provide the user with an online calendar through which the user can keep track of various events, including but not limited to financial transactions. Such online calendars are well known to those skilled in the art. The calendar may automatically indicate future and recurring transactions that have been scheduled. Such scheduled transactions may include automatic initiation of a payment or sending of a money request. By clicking on a transaction listed on the online calendar, the user can change the details (including scheduling) of the transaction.

When a particular button 225, 230, 240, 250, 260, 270, 280, or 290 is selected, the payment enabler 170 typically highlights it and provides the selected functionality in the large area 220 of the graphical user interface. The buttons 225, 230, 240, 250, 260, 270, 280, and 290 may be displayed on all Web pages provided to the user by the payment enabler 170 in order to provide the user with an easy way to switch between features of the payment enabler while logged into his or her account.

Online Statements of Pending and Completed Transactions

Figure 3:
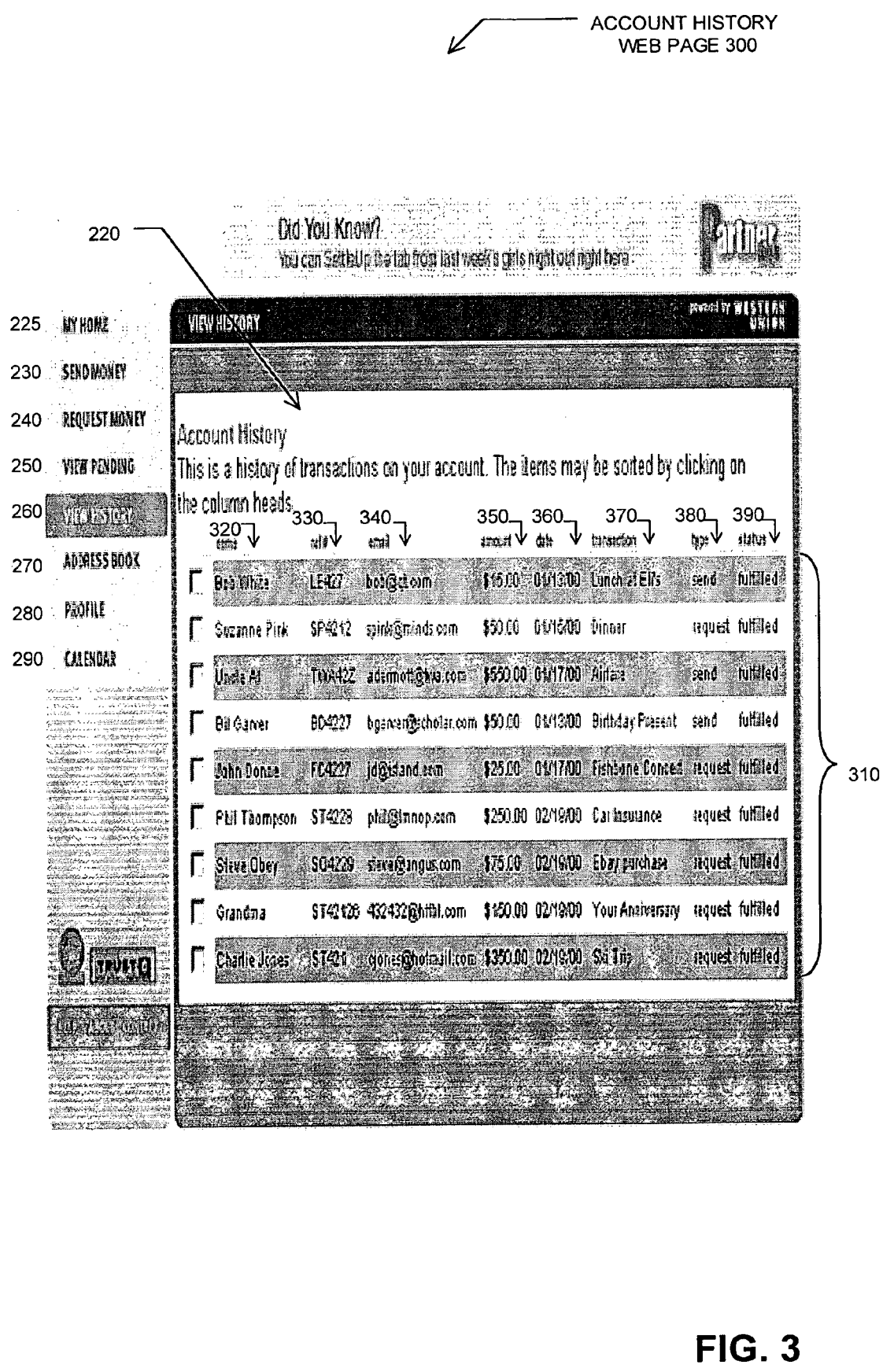

FIG. 3 is a block diagram illustrating an exemplary account history Web page 300, which the user may access by selecting the "View History" button 260. The online statement of history transactions is displayed in the area 220 of the Web page. Because the button 260 has been selected, it is shown highlighted. The other buttons 225, 230, 240, 250, 270, 280, and 290 are provided toward the leftmost side of the Web page to allow the user to easily switch to other features of the payment enabler 170.

The online statement of history transactions comprises completed transactions 310. A given transaction may comprise a "send money" transaction or a "request money" transaction depending on whether the user sent money to another individual or requested money from another individual. Each of the transactions 310 occupies one row of the area 220 and includes entries for each of the columns 320, 330, 340, 350, 360, 370, 380, and 390. By clicking on a column head, the user can sort the transactions 310 by their entries for the column corresponding to that column head.

For each of the transactions 310, the entry in column 320 comprises the name of the counter party to the transaction. The entry in column 330 comprises a unique reference number assigned to the transaction by the payment enabler 170. The entry in column 340 comprises the e-mail address of the counter party to the transaction. The entry in column 350 comprises the amount 180 that the user sent to or requested from the listed counter party for the transaction. The entry in column 360 comprises the date that the transaction was initiated. The entry in column 370 comprises a subject that the user has provided to identify the transaction.

The entry in column 380 indicates the type of the transaction. For example, the word "send" in this column 380 may indicate a "send money" transaction. "Request" may indicate a "request money" transaction. "Receive" may indicate a transaction in which money was received from another individual who used the "send money" process 600.

In some embodiments of the present invention, a payee 130 in a given transaction has the opportunity to reverse a received payment. In that case, the type column 380 for that transaction may have the word "refund."

The entry in column 390 indicates the status of the transaction. If the transaction has been completed, then the word "fulfilled" may appear in the column 390. In some embodiments of the present invention, a payor 110 in a given transaction has the opportunity to cancel a pending transaction before it is completed. The word "canceled" in the column 390 may indicate such a canceled transaction.

By clicking the button 250, the user of an account can obtain a Web page (not shown) similar to that of FIG. 3 but listing only pending transactions. Pending transactions include transactions that the user authorized the payment enabler 170 to initiate but that have not yet been completed. Such transactions may be indicated by the word "pending" in the status field 390.

In some embodiments of the present invention, the payment enabler 170 permits a user who has begun entering transaction details but has not finished to save the details entered up till that point. In such an embodiment, the user can later complete entry of the transaction details and then authorize the payment enabler 170 to initiate the transaction. Such a transaction may be listed in the statement of pending transactions with the word "draft" in the status field.

Address Book Functionality

Figure 4:
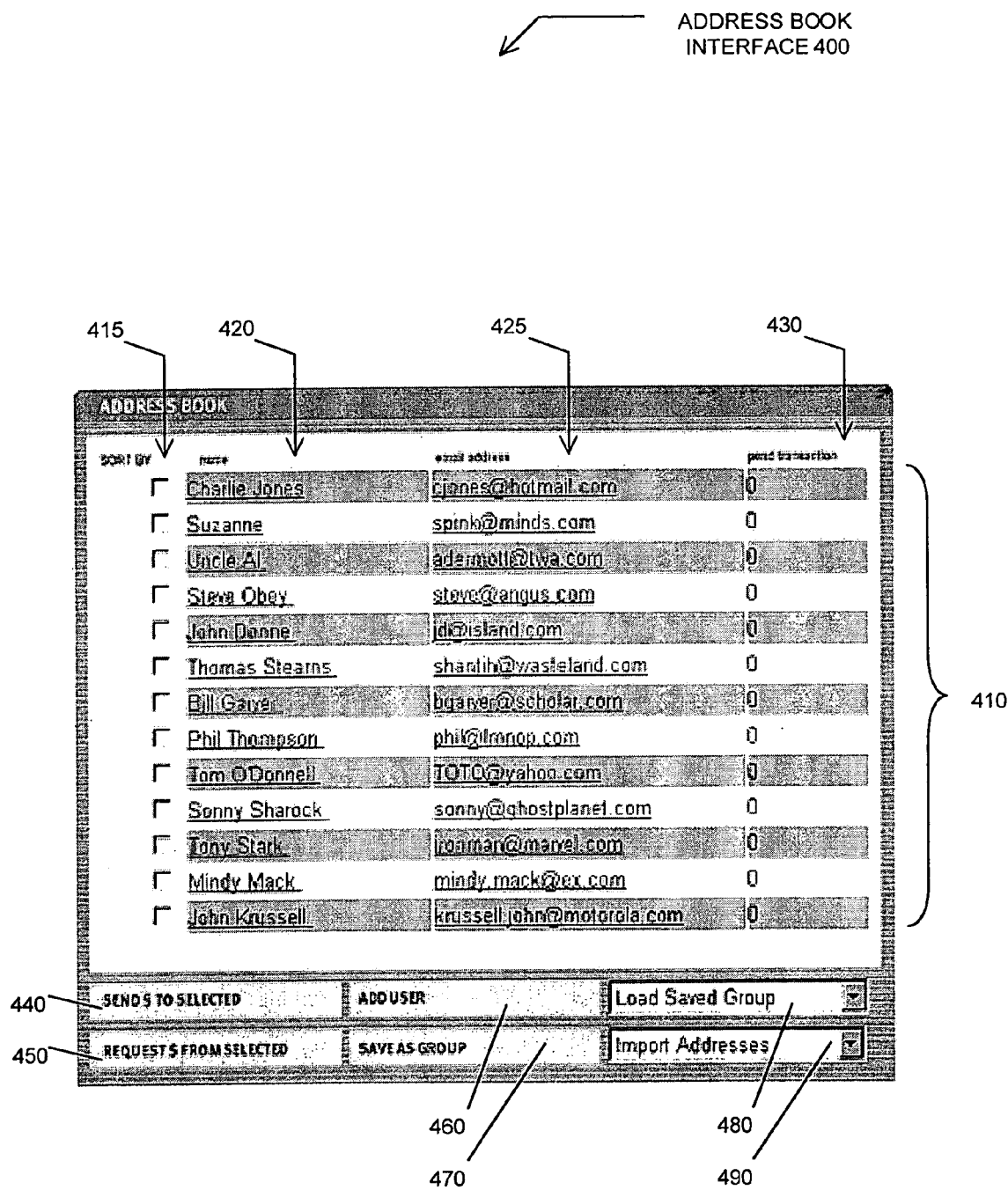
FIG. 4 is a block diagram illustrating an address book interface in accordance with an exemplary embodiment of the present invention.

FIG. 4 is a block diagram illustrating an exemplary address book interface 400. The user may access this address book interface 400 by clicking on the button 270.

The address book interface includes a listing of address book entries 410 for a user-defined group of people. Each address book entry occupies a row of the display and includes information for each of the columns 420, 425, and 430. By clicking on a column head for one of these columns, the user can sort the address book entries 410 by their information in the column corresponding to that column head. Column 415 comprises a check box that can be either checked or unchecked for each of the address book entries 410.

For each of the address book entries 410, the information in column 420 comprises the name of a person with an e-mail address. The information in column 425 comprises an e-mail address of the person listed in column 420. The information in column 430 comprises the number of transactions currently pending for the user with the person listed in column 420 as the counter party.

By clicking the button 460, the user can add a new address book entry to the current display of address book entries. There may also be a button (not shown) allowing the user to delete an address book entry from the current display of address book entries.

By clicking the button 470, the user can save the entries 410 in the current display of address book entries for future reference. After the user clicks the button 470, a subsequent Web page may prompt the user for the name under which the group should be saved. If the group being saved is an update to a group that was earlier saved, the Web page may provide the user the option to replace the old group by saving the updated group under the same name as the old group was saved.

By clicking the drop-down menu 480, the user can select a previously saved group. In response, the payment enabler provides the user with a Web page like that of FIG. 4, except the address book entries 410 of the current group are replaced with address book entries for the selected group.

By making a selection from the drop-down menu 490, the user can import address book entries from other programs. Once imported, these address book entries will be displayed on a Web page similar to that of FIG. 4 as the address book entries 410.

By clicking on the button 440, the user initiates the "send money" process 600 (discussed later) to send money to all the individuals whose address book entries 410 are checked in column 415. By clicking on the button 450, the user initiates the "request money" process 900 (discussed later) to request money from all the individuals whose address book entries 410 are checked in column 415. When the "send money" process 600 and the "request money" process 900 are initiated in this manner through the address book interface 400, the user need not later specify again the individuals (and their e-mail addresses) to whom the user wishes to pay money or from whom the user wishes to request money.

The user may check the check box (column 415) for one or more of the address book entries 410 by clicking on that check box. The user may uncheck an already checked check box by clicking on it again.

Registration for an Account with the Payment Enabler

Figure 5:
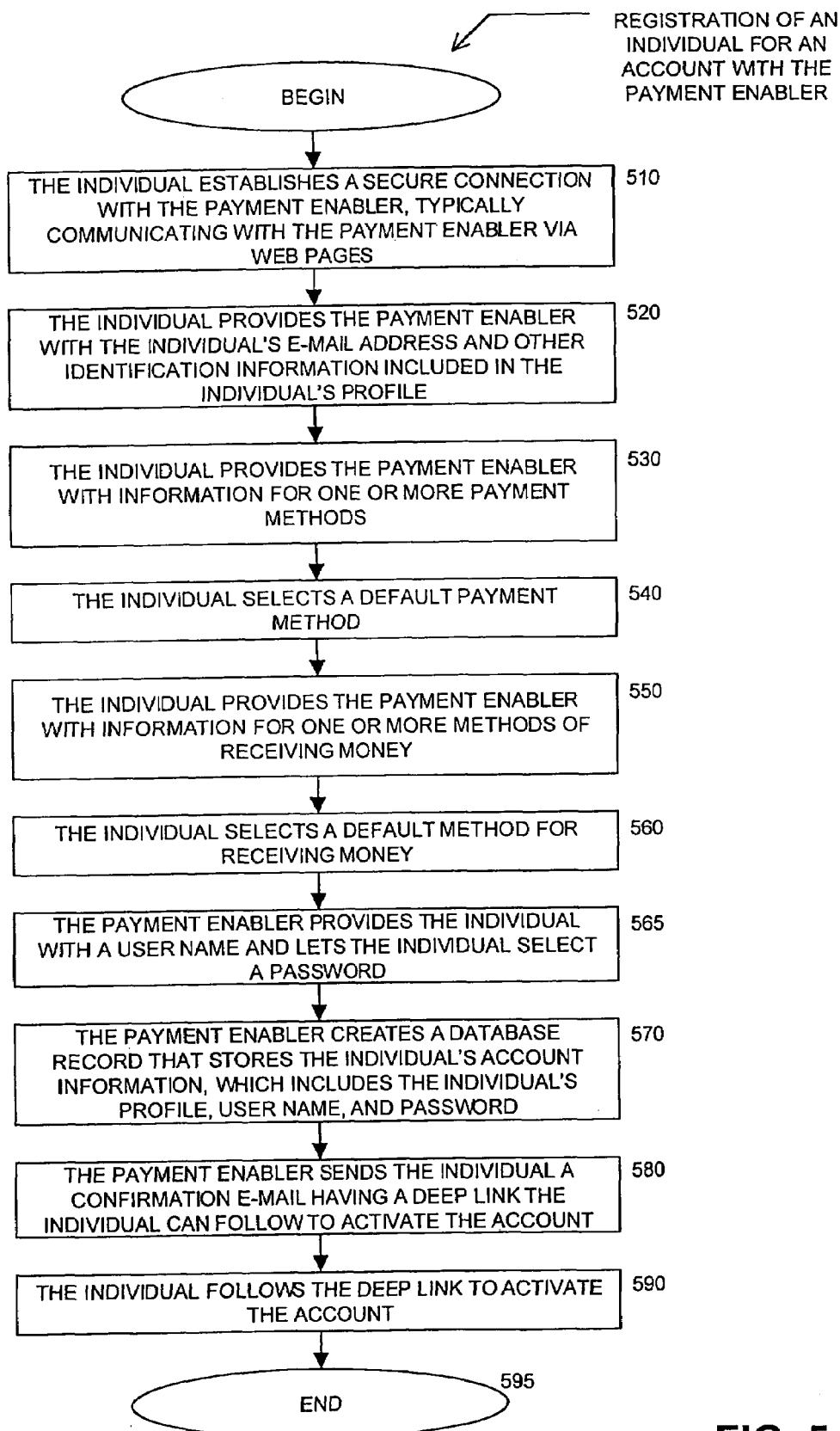
FIG. 5 is a flow chart illustrating steps for registration of an individual for an account with the payment enabler in accordance with an exemplary embodiment of the present invention.

FIG. 5 is a logical flow diagram illustrating exemplary steps for registration of an individual for an account with the payment enabler 170. The registration process begins with step 510.

In step 510, the individual establishes a secure connection with the payment enabler 170. Typically, the individual communicates with the payment enabler 170 via Web pages. In step 520, the individual provides the payment enabler 170 with the individual's e-mail address and other identification information included in the individual's profile.

In step 530, the individual provides the payment enabler 170 with information for one or more payment methods. In step 540, the individual selects a default payment method.

In step 550, the individual provides the payment enabler 170 with information for one or more methods of receiving money. In step 560, the individual selects a default method for receiving money.

In step 565, the payment enabler 170 provides the individual with a user name and password. Alternatively, the payment enabler 170 may permit the individual to choose his or her own password.

In step 570, the payment enabler 170 creates a database record that stores the individual's account information. This account information includes the profile of the individual, as well as the individual's user name and password. This database record may also include a pending transactions file and a history transactions file that store the information that the payment enabler 170 respectively uses to produce at the individual's request the online statement of pending transactions for the individual and the online statement of history transactions for the individual.

In step 580, the payment enabler 170 sends the individual a confirmation e-mail having a deep link that the individual can follow to activate the account. In step 590, the individual follows the deep link to activate the account. The registration process then ends in step 595.

Sending Money to Other Individuals

Figure 6:
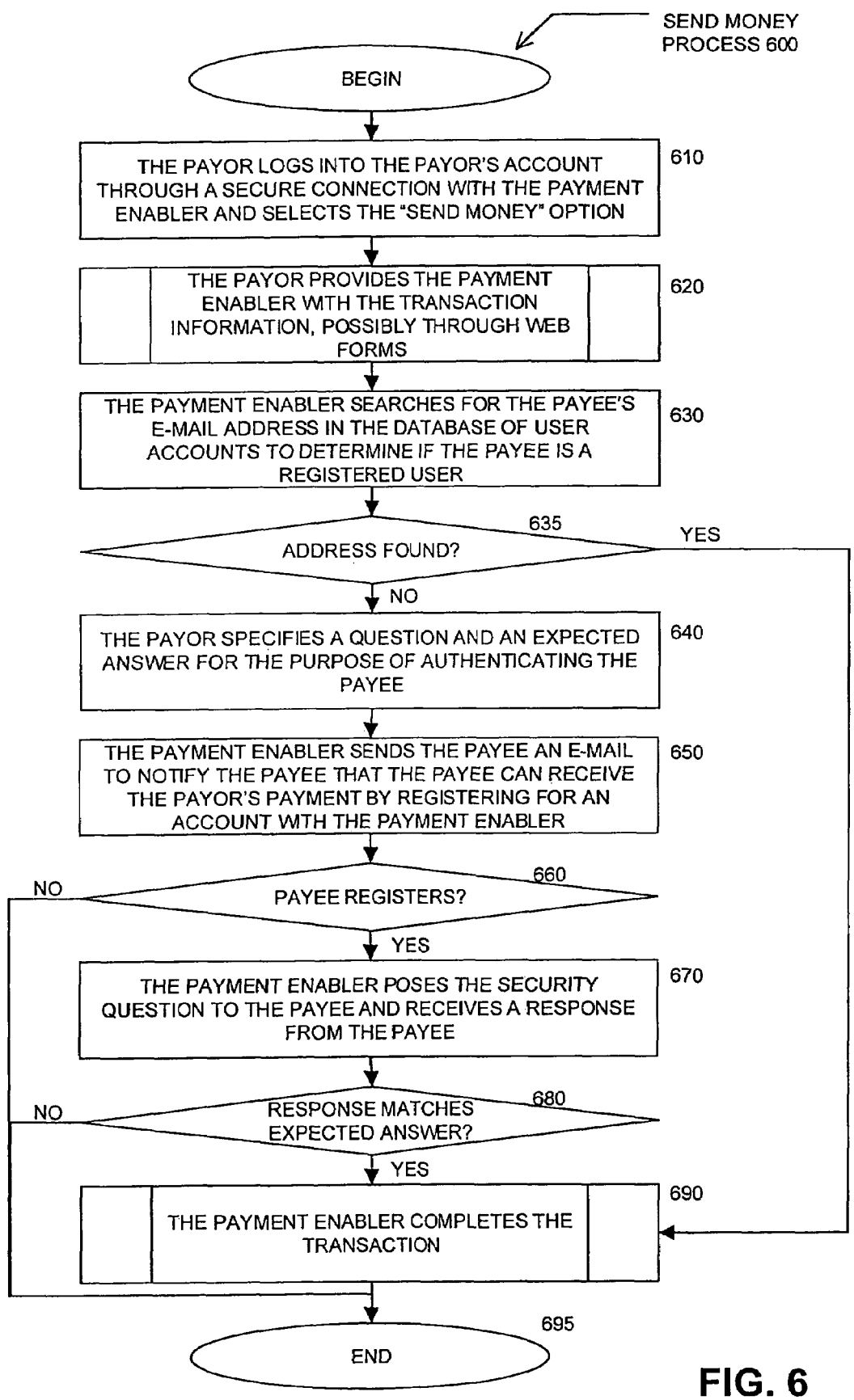
FIG. 6 is a flow chart illustrating the steps of a process through which a payor can send money in accordance with an exemplary embodiment of the present invention.

FIG. 6 is a logical flow diagram illustrating exemplary steps for a send money process 600 in which a payor 110 can send money 180 to a payee 130. The send money process 600 begins with step 610.

In step 610, the payor 110 logs into the payor's account through a secure connection with the payment enabler 170 and selects the "send money" option, perhaps by clicking the "send money" button 230.

In step 620, the payor 110 provides the payment enabler 170 with the send money transaction information. The payor 110 may communicate this information to the payment enabler 170 through Web forms.

In step 630, the payment enabler 170 searches for the e-mail address of the payee 130 in the database of user accounts to determine if the payee is a registered user. In step 635, the payment enabler 170 determines if the e-mail address of the payee 130 was found. If the e-mail address of the payee 130 was found, then the "YES" branch is followed to step 690 because the payee is already a registered user. In that case, the payment enabler 170 completes the transaction in step 690 before the send money process 600 ends in step 695.

Referring again to step 635, if the payment enabler 170 determines that the e-mail address of the payee 130 was not found, then the "NO" branch is followed to step 640 because the payee is not already a registered user. In step 640, the payor 110 specifies a question and an expected answer for the purpose of authenticating the payee 130.

In step 650, the payment enabler 170 sends the payee 130 an e-mail to notify the payee that the payee can receive the payment from the payor 110 by registering for an account with the payment enabler. The e-mail may include a link that the payee 130 can follow to register for the account with the payment enabler 170. In step 660, the payment enabler 170 determines if the payee registers for an account with the payment enabler.

If the payee 130 never registers for an account with the payment enabler 170, then the "NO" branch is followed to step 695, and the send money process 600 ends. If, in step 660, the payee 130 does register for an account with the payment enabler 170, then the "YES" branch is followed to step 670.

In step 670, the payment enabler 170 poses the security question to the payee 130 and receives a response from the payee. In step 680, the payment enabler 170 determines if the response matches the expected answer to the security question that was entered by the payor 110 in step 640. If the response does not match the expected answer, then the "NO" branch is followed to step 695, and the send money process 600 ends.

If the response does match the expected answer in step 680, then the "YES" branch is followed to step 690. In step 690, the payment enabler 170 completes the transaction. The send money process 600 then ends in step 695.

Figure 7:
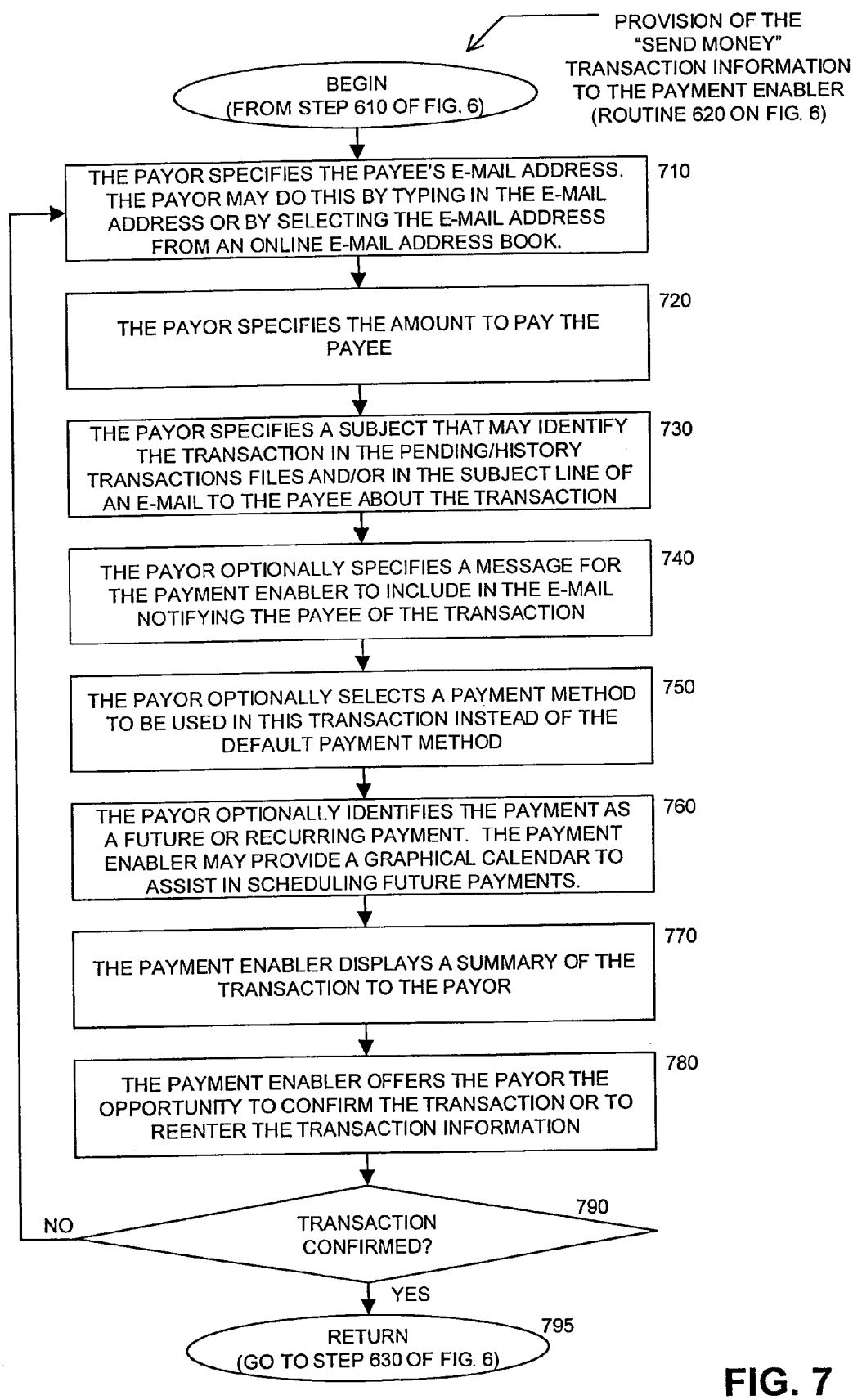
FIG. 7 is a flow chart illustrating the steps by which a payor can provide transaction information to the payment enabler so that the payment enabler can process a "send money" command in accordance with an exemplary embodiment of the present invention.

FIG. 7 is a logical flow diagram illustrating exemplary steps for provision of the "send money" transaction information to the payment enabler 170 by the payor 110. The logical flow diagram of FIG. 7 comprises an exemplary process corresponding to routine 620 on FIG. 6. The routine 620 begins with step 710.

In step 710, the payor 110 specifies the e-mail address of the payee 130. The payor 110 may do this by typing in the e-mail address or by selecting the e-mail address from an online e-mail address book.

In step 720, the payor 110 specifies the amount 180 to pay the payee 130. In step 730, the payor 110 specifies a subject that may identify the transaction in the pending and history transactions files. The subject may also identify the transaction in the subject line of an e-mail to the payee 130 about the transaction. In step 740, the payor 110 optionally specifies a message for the payment enabler 170 to include in the e-mail notifying the payee 130 of the transaction.

In step 750, the payor 110 optionally selects a payment method to be used in this transaction instead of the default payment method. In step 760, the payor 110 optionally identifies the payment 180 as a future or a recurring payment. The payment enabler 170 may provide a graphical calendar to assist in scheduling future payments. For example, the payor 110 may click a box corresponding to a specific day to schedule the payment 180 for that day.

In step 770, the payment enabler 170 displays a summary of the transaction to the payor 110. In step 780, the payment enabler 170 offers the payor 110 the opportunity to confirm the transaction or to reenter the transaction information.

In step 790, the payment enabler 170 determines if the payor 110 has confirmed the transaction. If the transaction is confirmed, then the "YES" branch is followed to step 795, and the routine 620 returns. However, if the payment enabler 170 determines in step 790 that the payor 110 has decided not to confirm the transaction, then the "NO" branch is followed back to step 710, and the payor reenters the transaction information.

Figure 8:
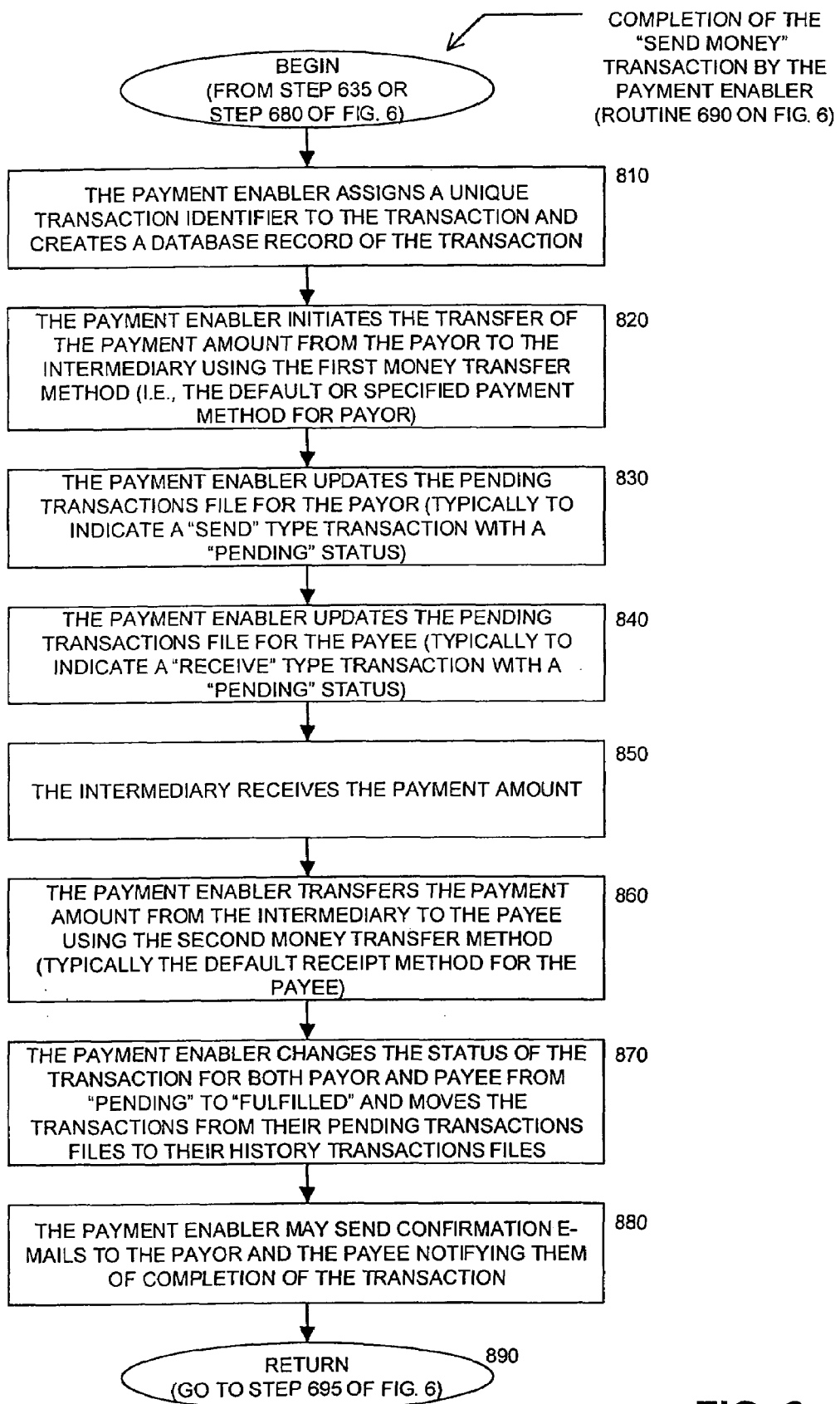
FIG. 8 is a flow chart illustrating the steps for completion of a "send money" transaction by the payment enabler in accordance with an exemplary embodiment of the present invention.

FIG. 8 is a logical flow diagram illustrating exemplary steps for completion of the "send money" transaction by the payment enabler 170. The logical flow diagram of FIG. 8 comprises an exemplary process corresponding to routine 690 of FIG. 6. The routine 690 begins with step 810.

In step 810, the payment enabler 170 assigns a unique transaction identifier to the transaction and creates a database record of the transaction. This unique identifier may be used to access the record of a transaction whenever a customer inquires about the transaction.

In step 820, the payment enabler 170 initiates the transfer of the payment amount 180 from the payor 110 to the intermediary 160 using the first money transfer method. If the payor 110 identified the payment 180 as a future or recurring payment in step 760 of FIG. 7, then the payment enabler 170 waits until the specified time or times to initiate the transfer of the payment amount 180 from the payor to the intermediary 160.

If the payor 110 specified a particular payment method to be used in this transaction in step 750 of FIG. 7, then that payment method comprises the first money transfer method.

Otherwise, the first money transfer method comprises the default payment method specified for the account of the payor 110.

In step 830, the payment enabler 170 updates the pending transactions file for the payor 110. Typically, this update involves adding the transaction to the pending transactions file for the payor 110 as a "send" type transaction with a "pending" status.

In step 840, the payment enabler 170 updates the pending transactions file for the payee 130. Typically, this update involves adding the transaction to the pending transactions file for the payee 130 as a "receive" type transaction with a "pending" status.

In step 850, the intermediary 160 receives the payment amount 180. In step 860, the payment enabler 170 transfers the payment amount 180 from the intermediary 160 to the payee 130 using the second money transfer method. Typically, the second money transfer method comprises the default money receipt method specified for the account of the payee 130.

The payment enabler 170 may send an e-mail to the payee 130 to notify the payee of the money 180 being sent. This e-mail may optionally require that the payee 130 authorize receipt of the money 180 before the payment enabler 170 will complete the payment through the second money transfer method. This e-mail may also optionally offer the payee 130 the opportunity to change the second money transfer method for this particular transaction from the default money receipt method to another money receipt method.

In step 870, the payment enabler 170 changes the status of the transaction for both the payor 110 and the payee 130 from "pending" to "fulfilled" and moves the transactions from their pending transactions files to their history transactions files.

In step 880, the payment enabler 170 may send confirmation e-mails to the payor 110 and the payee 130 notifying them of completion of the transaction. The routine 690 then returns in step 890.

Requesting Money from Other Individuals

Figure 9:
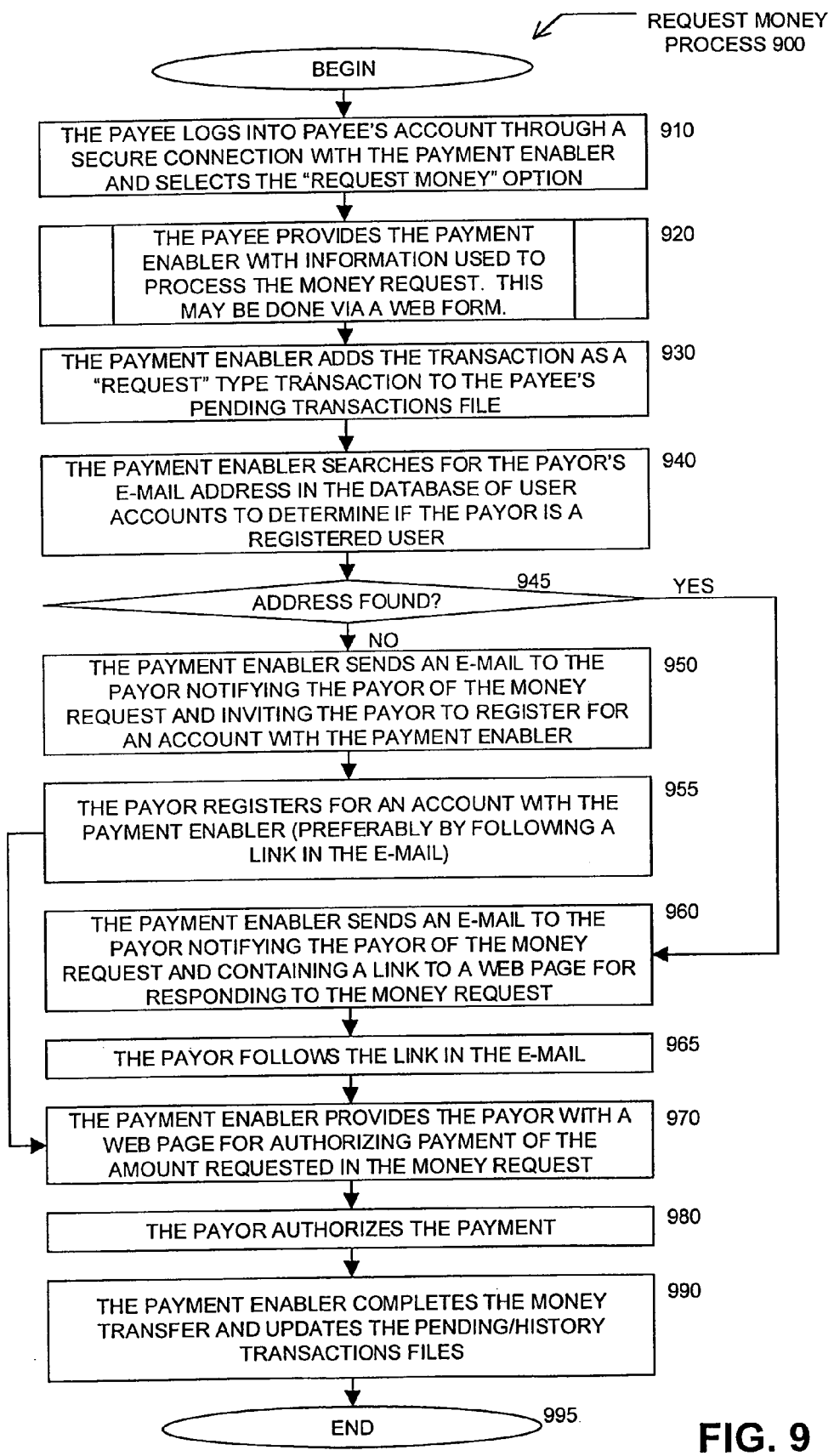
FIG. 9 is a flow chart illustrating the steps of a process through which an individual can request money from another person in accordance with an exemplary embodiment of the present invention.

FIG. 9 is a logical flow diagram illustrating exemplary steps for a request money process 900 in which a payee 130 can request money 180 from a payor 110. The request money process 900 begins with step 910.

In step 910, the payee 130 logs into the payee's account through a secure connection with the payment enabler 170. The payee 130 then selects the "request money" option, perhaps by clicking the "request money" button 240.

In step 920, the payee 130 provides the payment enabler 170 with information used to process the money request. This may be done via a Web page form. In step 930, the payment enabler 170 adds the transaction as a "request" type transaction to the pending transactions file of the payee 130.

In step 940, the payment enabler 170 searches for the e-mail address of the payor 110 in the database of user accounts to determine if the payor is a registered user of the payment enabler 170. In step 945, the payment enabler 170 determines if the address was found. If the address was not found, then the payor 110 does not have an account with the payment enabler 170, and the "NO" branch is followed to step 950.

In step 950, the payment enabler 170 sends an e-mail to the payor 110 notifying the payor of the money request. This e-mail also invites the payor 110 to register for an account with the payment enabler 170.

In step 955, the payor 110 registers for an account with the payment enabler 170. Preferably, the payor 110 reaches a registration page of the payment enabler 170 by following a link in the e-mail. Step 970, to be discussed shortly, is then executed.

Referring again to step 945, if the payment enabler 170 found the e-mail address of the payor 110 in the database of user accounts, then the payor does have an account with the payment enabler, and the "YES" branch is followed to step 960. In step 960, the payment enabler 170 sends an e-mail to the payor 110 notifying the payor of the money request and containing a link to a Web page through which the payor can respond to the money request. In step 965, the payor 110 follows the link in the e-mail, and step 970 is then executed.

Step 970 follows either step 955 or step 965. In step 970, the payment enabler 170 provides the payor 110 with a Web page for authorizing payment of the amount 180 requested in the money request. If step 970 is reached from step 955, then the payment enabler 170 preferably provides this Web page to the payor 110 automatically at the end of the registration process.

In step 980, the payor 110 authorizes the payment 180. In step 990, the payment enabler 170 completes the money transfer with an intermediary 160 acting as a conduit between the payor 110 and the payee 130 in the manner already described. The payment enabler 170 also updates the pending and history transactions files for both the payor 110 and the payee 130. The request money process 900 then ends in step 995.

Figure 10:
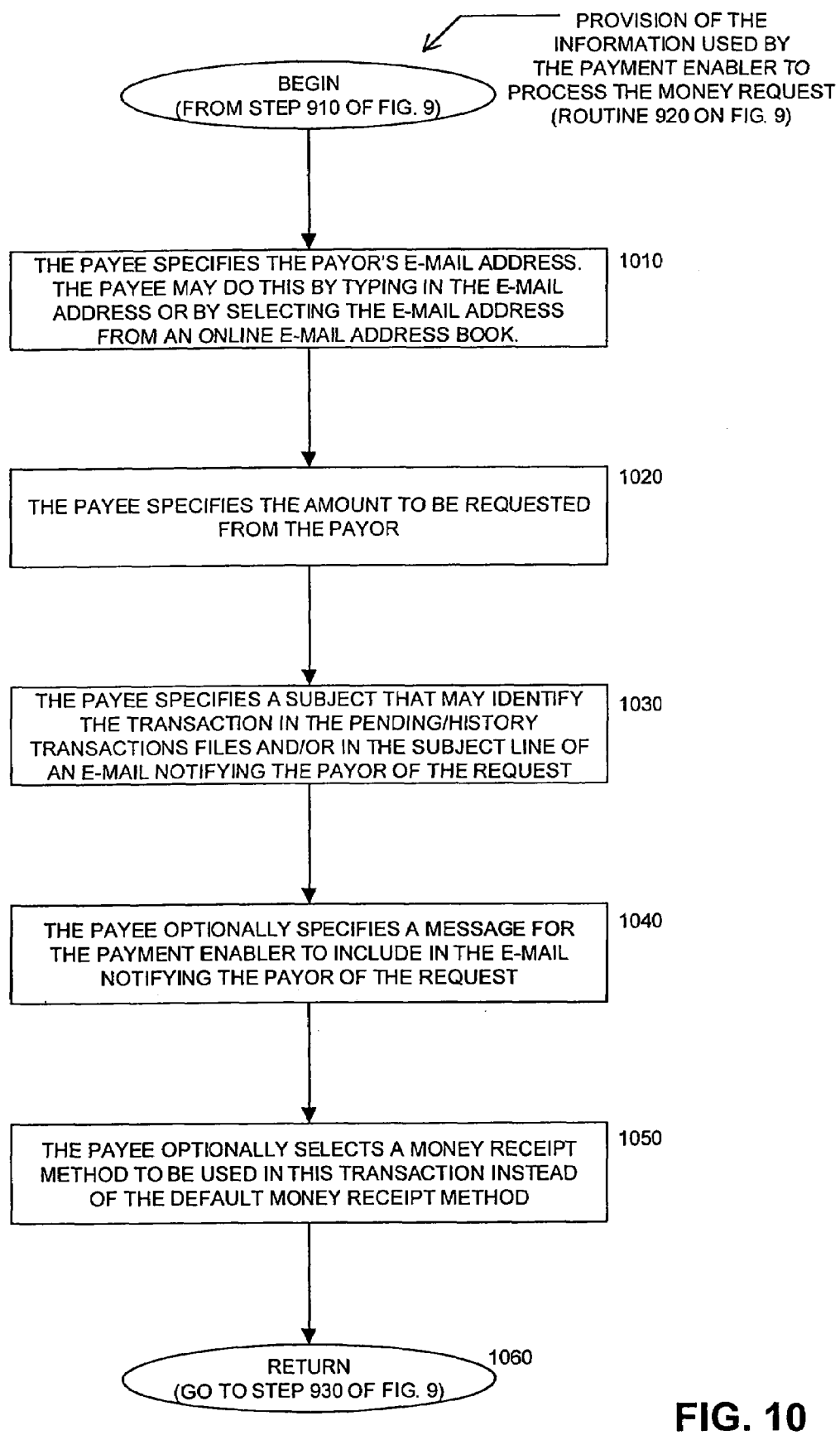
FIG. 10 is a flow chart illustrating the steps by which an individual can provide information used by the payment enabler to process a money request in accordance with an exemplary embodiment of the present invention.

FIG. 10 is a logical flow diagram illustrating exemplary steps by which the payee 130 can provide the payment enabler 170 with the information used by the payment enabler to process the money request. The logical flow diagram of FIG. 10 corresponds to routine 920 on FIG. 9. The routine 920 begins with step 1010.

In step 1010, the payee 130 specifies the e-mail address of the payor 110. The payee 130 may do this by typing in the e-mail address or by selecting the e-mail address from an online e-mail address book such as the one depicted in FIG. 4.

In step 1020, the payee 130 specifies the amount 180 to be requested from the payor 110. In step 1030, the payee 130 specifies a subject that may identify the transaction in the pending and history transactions files. This subject may also comprise the subject line of an e-mail notifying the payor 110 of the money request.

In step 1040, the payee 130 optionally specifies a message for the payment enabler 170 to include in the e-mail notifying the payor 110 of the money request. In step 1050, the payee 130 optionally selects a money receipt method to be used in this transaction instead of the default money receipt method specified in the payee's profile. The routine 930 then returns in step 1060.

The invention claimed is:

1. A computer implemented method for providing a money transfer service between first party and a second party through a payment enabler system, comprising the steps of:

maintaining at the payment enabler system a database of registered users that have registered with the payment enabler system, the registered users database comprising a plurality of records that include an email address and other account information including a default payment method and a default money receiving method;

maintaining at the payment enabler system an address book database for storing address book records on behalf of a first party comprising names associated with second parties with whom the first party may initiate a money transfer, each address book record including a name and an associated email address;

in response to selection by a first party of an entry in the address book database of a particular second party for purposes of initiating a transaction with the selected second party, retrieving the email address associated with the selected second party from the first party's associated address book records in the address book database;

accessing the registered users database and determining whether the retrieved email address associated with the selected particular second party has a record in the registered users database;

in response to a determination that the second party has no entry in the registered users database, sending the second party a registration invitation email utilizing the retrieved email address to notify the second party that a transaction is pending and instructing the second party to register with the payment enabler system by accessing the payment enabler system;

in response to accessing of the payment enabler system by the second party after the registration invitation email, conducting a user registration process comprising steps including receiving registration information comprising an email address of the registering user, identification information, and a default money transfer method;

in response to receiving registration information from a registering user, creating a database record in the registered users database including the registration information;

completing a transaction between the first party and the second party by the payment enabler transferring money between the first party and the second party utilizing a determined money transfer method;

storing additional information associated with a money transfer, the additional information including transaction type information and status information; and providing an account history display including information corresponding to money transfers between a first party and a plurality of second parties, the account history display comprising, for each money transfer transaction, one or more of the following information items: a name, a reference number associated with the payment enabler system, an email address, an amount, a date, a transaction description, and the additional information.

2. The method of claim 1, wherein the record in the registered users database includes security information provided by a first party, for association with a selected second party; and the step of completing the money transfer is carried out in response to registration by the second party and provision of corresponding expected security response information from the second party.

3. The method of claim 2, wherein the security information provided by the first party is a question and the corresponding expected security response information from the second party comprises an expected answer.

4. The method of claim 2, wherein the user registration process further comprises the steps of:

receiving the security information provided by the first party;

in further response to accessing the payment enabler system by the second party, providing a question corresponding to the security information to the registering user; and comparing a received response from the registering user to the corresponding expected security response information; and proceeding with the step of completing the transaction only if the received response matches the expected security response information.

5. The method of claim 1, wherein the transaction comprises a payment from the first party to the second party.

6. The method of claim 1, wherein the transaction comprises a request for a payment from the second party to the first party.

7. The method of claim 1, further comprising the step of, in response to determination that a second party already has an entry in the registered users database, completing the transaction between the first party and the second party.

8. The method of claim 1, wherein the registration invitation email sent to the second party by the payment enabler system includes a link that directs the second party to a registration web page associated with the payment enabler system.

9. The method of claim 1, wherein the transaction is a payment from the first party to the second party, and wherein in further response to a determination that a second party has no entry in the registered users database, obtaining authenticating information from the first party prior to sending the registration invitation email, and storing the authenticating information in the registered users database in anticipation of registration by the second party.

10. The method of claim 9, wherein the authenticating information comprises a question to be asked of the registering user and an expected answer.

11. The method of claim 1, wherein the user registration process comprises steps for allowing the registering user to select a default payment method from a plurality of payment methods, and a default money receiving method from a plurality of money receiving methods.

12. The method of claim 1, wherein the user registration process further comprises the step of sending a registering user a confirmation email including a deep link operative for activating an account of the registering user with the payment enabler system.

13. The method of claim 1, wherein the determined money transfer method comprises the default method for either making payment or receiving money.

14. The method of claim 1, wherein the determined money transfer method comprises a selected alternate payment method instead of a default payment method.

15. The method of claim 1, wherein the determined money transfer method comprises a selected alternate money receiving method instead of a default money receiving method.

16. The method of claim 1, wherein the transaction type information is selected from the following: send, request, refund.

17. The method of claim 1, wherein the status information is selected from the group: fulfilled, canceled, pending.

18. The method of claim 1, further comprising the step of providing an address book display for a party to select one or more particular second parties, the address book display comprising, for each addressee in the address book, one or more of the following information items: a selection box for selection, a name, an email address, and a number of transactions associated with the particular party.

19. The method of claim 1, wherein the money transfer method comprises steps for an first money transfer from a payor to an intermediary and steps for a second money transfer from the intermediary to a payee.

20. The method of claim 19, wherein the first money transfer steps are selected from the group: receiving a deposit of an amount of cash by the payor via a payment processor, debiting a credit card of the payor, debiting a bank account of the payor, debiting a stored value account of the payor, and receiving a paper check from the payor.

21. The method of claim 19, wherein the second money transfer steps are selected from the group: debiting a bank account of the intermediary to fund dispensing of cash to the payee through an automated teller machine, dispensing cash to the payee by a payment processor, crediting a credit card of the payee, crediting a bank account of the payee, crediting a stored value card of the payee, and sending a paper check to the payee.

\* \* \* \* \*